United States Patent [19]

Sugioka et al.

[11] Patent Number: 4,610,322

[45] Date of Patent: Sep. 9, 1986

[54] WEIGHT MEASURING APPARATUS FOR ELONGATED ARTICLES

[75] Inventors: Yukio Sugioka, Shiga; Yoshiharu Mikami, Kyoto, both of Japan

[73] Assignee: Kabushiki Kaisha Ishida Koki Seisakusho, Kyoto, Japan

[21] Appl. No.: 664,438

[22] Filed: Oct. 24, 1984

[30] Foreign Application Priority Data

Oct. 28, 1983 [JP] Japan ............................ 58-200849

[51] Int. Cl.[4] ...................... G01G 19/22; G01G 19/00; G01G 13/02
[52] U.S. Cl. .......................................... 177/25; 177/1; 177/116; 209/615; 209/625; 209/680
[58] Field of Search ................................ 177/116–123, 177/1, 25; 209/517, 606, 615, 625, 629, 674, 680, 691, 920

[56] References Cited

U.S. PATENT DOCUMENTS

| | | | |
|---|---|---|---|
| 2,976,006 | 3/1961 | Stambera | 177/119 X |
| 3,593,896 | 7/1971 | Brouwer et al. | 177/120 X |
| 4,143,725 | 3/1979 | Gaubert | 177/1 X |
| 4,266,691 | 5/1981 | Wolwowicz | 177/121 X |
| 4,522,274 | 6/1985 | Konishi et al. | 177/25 |

FOREIGN PATENT DOCUMENTS 2428996 1/1975 Fed. Rep. of Germany ...... 209/626

*Primary Examiner*—E. A. Goldberg
*Assistant Examiner*—Patrick W. Foster
*Attorney, Agent, or Firm*—Browdy and Neimark

[57] ABSTRACT

This invention then relates to a measuring apparatus wherein a plurality of measuring machines are provided transversely for continuous measuring on a lower side of a feeding hopper enclosing a long size such as dried noodle or the like in alignment, which is subjected to a combined measuring accurately by a predetermined weight as conveyed continuously crosswise.

4 Claims, 9 Drawing Figures

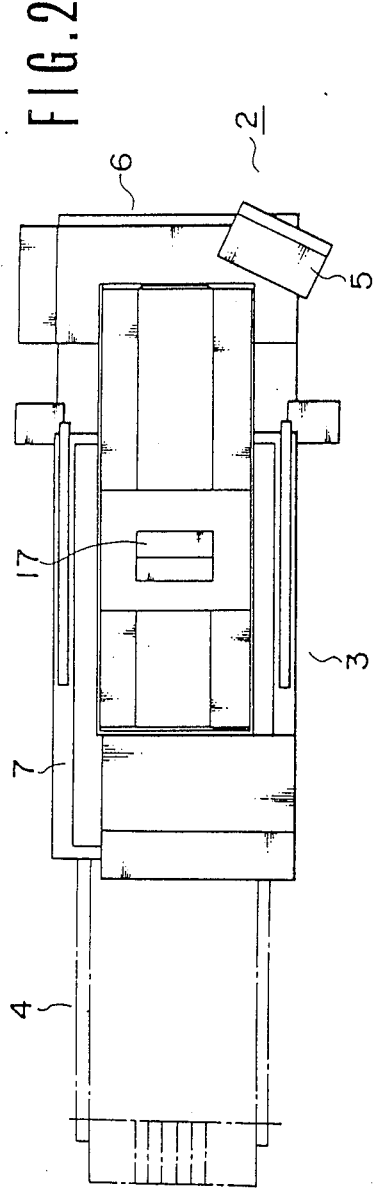
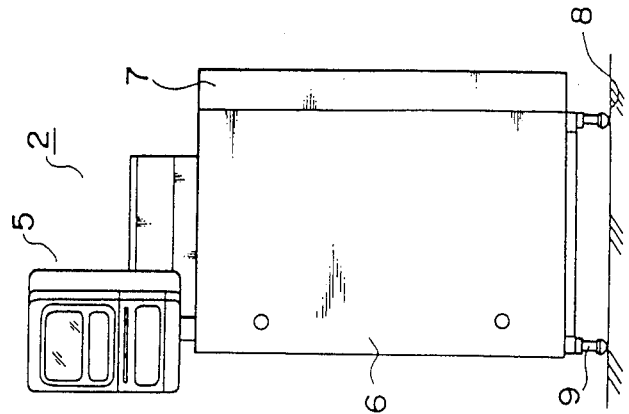
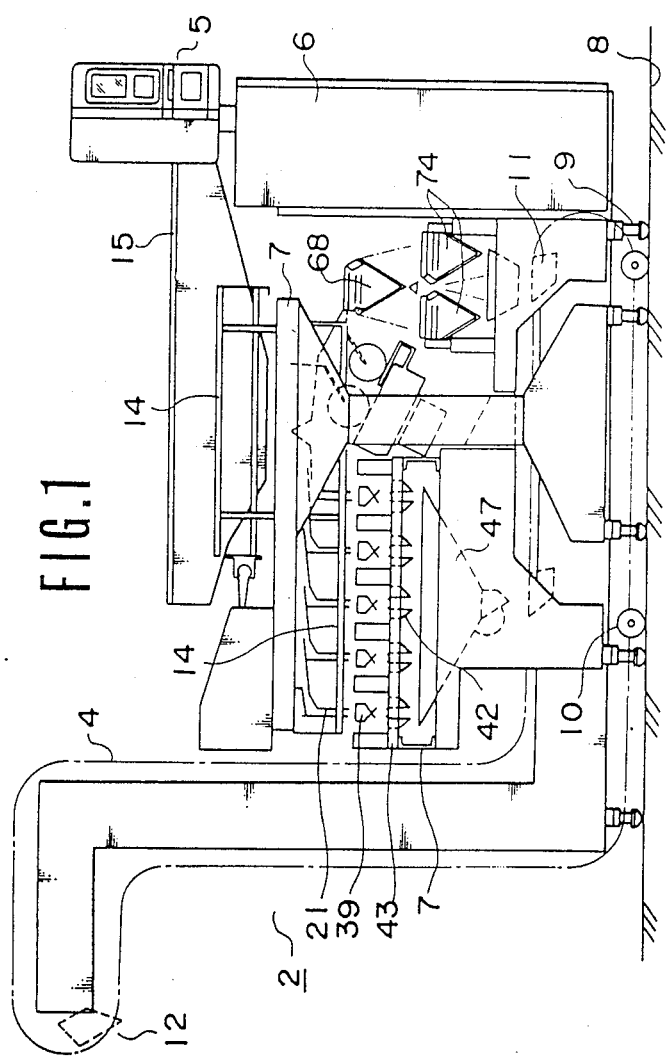

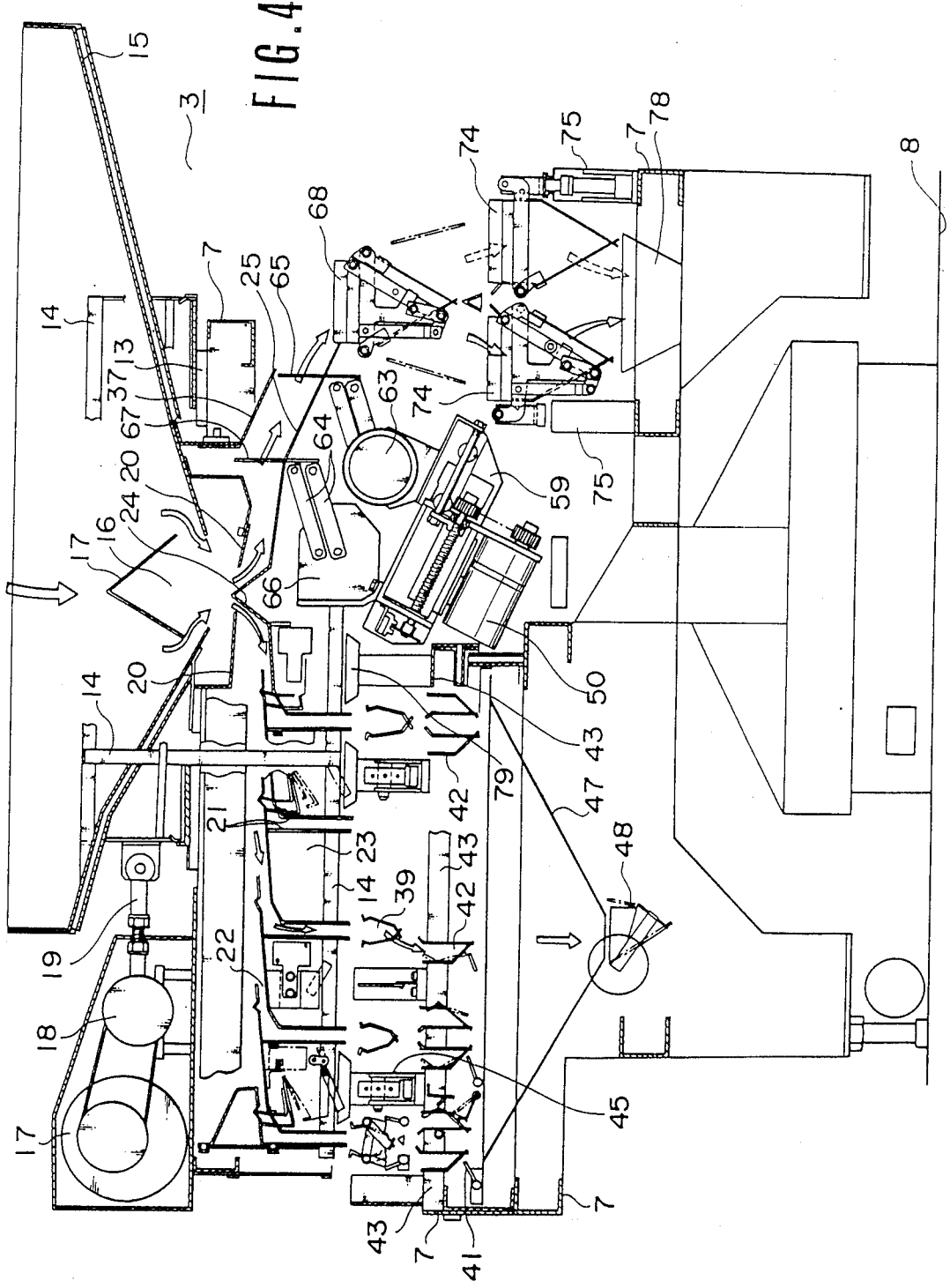

WEIGHT MEASURING APPARATUS FOR ELONGATED ARTICLES

FIELD OF THE INVENTION

This invention relates to a measuring apparatus for measuring a elongated objects such as dried noodles, fine noodles or the like, continuously, at a set weight.

DESCRIPTION OF THE PRIOR ART

As is well known, many pieces of merchandise are on sale in a distribution market such as suppermarket or the like, however, the merchandise are sold by weight in packages.

In the case of granulated merchandise such as beans and the like, for example, the merchandise are supplied to a plurality of measuring machines comprising a measuring hopper and a weight detector each), measured values on each measuring machine are combined with each other, the combination whereby a total value is given at a set weight plus minimum excess is selected, the merchandise in the weight measuring machine which corresponds to the selected combination are thus discharged at each set weight. Such a compact type of combination measuring apparatus employing a microcomputer has been developed previously and employed practically therefore for this purpose.

In such combination measuring apparatus, the most common apparatus is a compact type wherein a measuring hopper supported on a weight detector such as load cell or the like is provided under, for example, not less than 10 pool hoppers disposed circularly and concentrically therewith under a dispersion table.

Meanwhile, in the case in which an elongated object such as a dried noodle or the like is handled, as mentioned hereinabove, in a distribution market, and it is preferred that packaging weight of such dried noodles be rather the noodles can be packaged by weight rather than by number.

In this case the weight of each package commodity must not be less than a set weight, and hence it is desirable that the package correspond to the set weight plus a minimum excess. However, a combination measuring system on a microcomputer arithmetic control according to statistics and stochastic logic in a measuring apparatus for beans and the like will preferably be applied to merchandise of such elongated shape.

Be that as it may, the situation is such that merchandise such as dried noodles and the like must be secured first in an aligned state for being of a constant length, and that a supply to a weight detector in the aligned state must be constant and accurate basically at all times. Consequently there is a latent problem that a design to satisfy each process from a supply of the long size to measuring, discharging and packaging in a state where the orientation of the long size is kept parallel. Thus an aligned state of the objects to be measured will have to be obtained.

In a addition, there may be a case where the elongated object is broken unexpectedly during conveyance in a measuring apparatus or in conveyance from manufacturing process to the measuring apparatus, and in such case an occurrence of non-conforming article of a short size such as broken noodle or the like cannot be avoided. If that is the case and, then another problem on security will arise that an unexpected charging on each kinematic part must be prevented during the course of conveying such short size to each part together with a normal long size.

PROBLEMS OF THE PRIOR ART

To cope with the circumstances above, an automatic measuring apparatus for elongated articles which is equipped with a conveying path for which a bulk pool hopper is provided to a single measuring hopper having a weight detector such as load cell or the like has been developed and so designed, however, since the elongated articles such as dried noodles or the like is aligned and kept in parallel longitudinally and conveyed continuously crosswise, a design similar to a circular array combination measuring apparatus for beans or the like cannot disperse the elongated object radially from its shape. A combination measuring on a plurality of measuring machines, or a selective combination of a plurality of measuring hoppers according to statistics and probability cannot be effected. For this reason, a plurality of automatic measuring apparatuses with a single measuring hopper will have to be arrayed, which may involve advantages of a large space requirement and high cost, complicated operation control, and inferior precision.

Such being the circumstances, a combination measuring apparatus for elongated objects which is effective enough to satisfy real operation has not been developed despite there being a long felt need therefore.

SUMMARY OF THE INVENTION

To solve problems involved with measuring of a set weight of elongated objets such as dried noodles or the like in a continuous conveyance according to the above-described prior art, a first object of the invention is to provide a measuring apparatus wherein a simultaneous supply of the elongated objects to a plurality of set pool hoppers is realized by ensuring a continuous conveyance in the objects an aligned state the second object is to provide a supply to measuring hoppers arrayed in series so that, a combination measuring to select an optimum combination of set quantity plus minimum excess is made possible. The third object is to provide further conveyance, measuring and discharge of the elongated objects without problems despite mixing of a broken noodle or the like, thus benefiting a measuring utilized field in the distribution industry.

BRIEF DESCRIPTION OF THE DRAWINGS

FIG. 1 is a general schematic perspective side view of the apparatus according to the present invention.

FIG. 2 is a plan view thereof.

FIG. 3 is a side view thereof.

FIG. 4 is a side view of a measuring unit.

DETAILED DESCRIPTION OF THE PREFERRED EMBODIMENT

One preferred embodiment of this invention will now be described with reference to the accompanying drawings.

Figure 8:
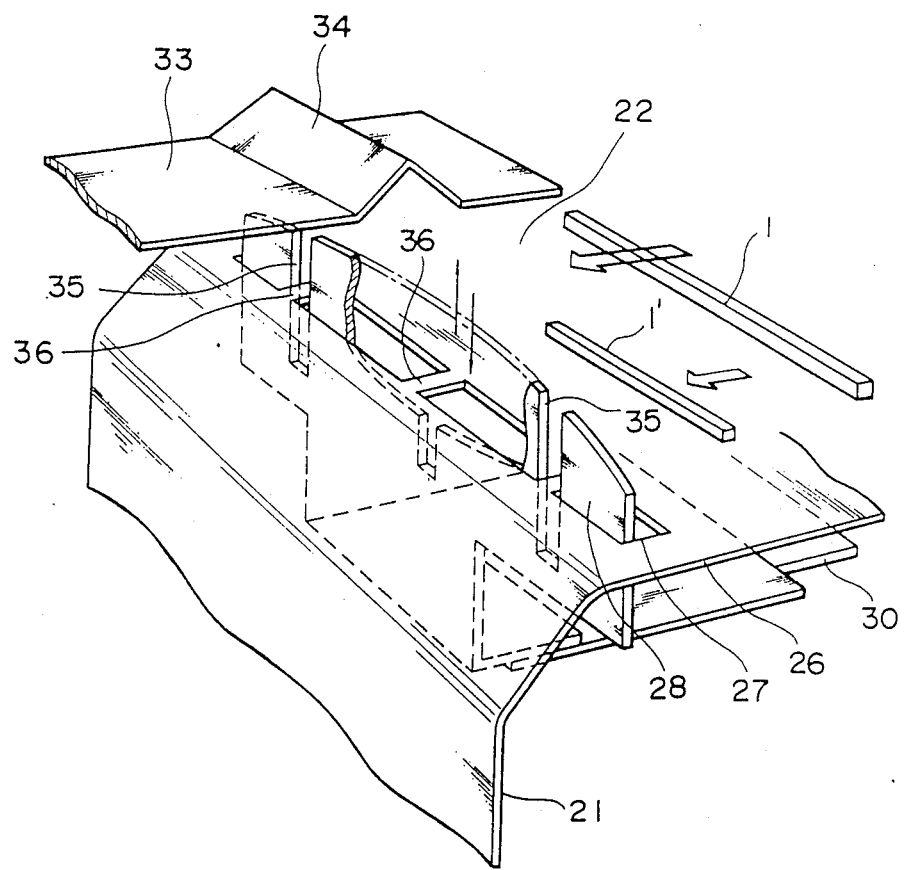
FIG. 8 is a partially cutaway perspective view for illustrating a positional relation between a shutter and a bridge at opening.

The illustrated examples represent a measuring apparatus 2 for measuring a set weight by continuously conveying a group of dried noodles if a long size, as shown in FIG. 8, and as shown in FIGS. 1, 2, 3. The apparatus comprises a measuring unit 3 as a body thereof, a delivery unit 4 of conveyor connecting to a next-stage packaging process, and a control unit 6 having a control panel 5, the whole apparatus formed solidly on a framework of an apparatus frame 7, installed through jack stands 9, 9, . . . expandable vertically to a base 8 of predetermined portion and movable properly through casters 10, 10, . . . by drawing in the jack stands 9.

Delivery unit 4 has standard bucket conveyors 11, 11, 11, . . . , extends forward to rise from a bottom of the measuring unit 3, and is provided with a timing hopper 12 on its front end and connected to a packaging apparatus (not illustrated) on the next stage.

In the measuring unit 3, as shown in detail in FIG. 4, a feeding hopper 15 is provided integrally with a sub-frame 14 provided slidably transversely or longitudinally to a guide rail 13 provided on an upper part of the apparatus frame 7. A divider 17, angular in section, which is bridged vertically is provided over a discharge port 16 and a dried noodle 1 to be fed can be distributed at a set ratio as kept vertically aligned longitudinally from the discharge port 16.

On the other hand, a proper vibrator 18 which is connected to a motor 17 is provided a side coming near to the front of the guide rail 13 on the upper part of the apparatus frame 7, and a connecting rod 19 is coupled to the sub-frame 14 to vibrate the sub-frame 14 on the guide rail 13 transversely, or longitudinally at a set cycle and further vibrate the feeding hopper 15 transversely likewise, thus distributing, discharging and feeding the dried noodle 1 without causing bridge or stop.

Discharge adjusting shutters 20, 20 are provided across the discharge port 16 of the feeding hopper 15 to control the opening rate.

Further, another sub-frame 14 swinging from the sub-frame 14 is provided integrally extending from one side to the other of the discharge port 16. Downward chutes 21, 21, . . . in a paired unit which are disposed in set number of stages and at set intervals longitudinally are provided integrally with the lower side sub-frame 14 with base ends bent gently and slantingly toward a side of the discharge port 16 of the feeding hopper 15, a transverse conveying trough 23 having openings 22, 22, . . . stepwise which are connected to the chutes 21, 21, . . . is formed with the base end side coupled to a divider 24 facing discharge gaps of the shutters 20, 20 on the lower side of the discharge port 16 of the feeding hopper 15, and the divider 24 is coupled to a bulk chute 25 on the other side.

Accordingly, the transverse conveying trough 23, the bulk chute 25 and the divider 24 are coupled to the vibrator 18 through the sub-frame 14 together with the feeding hopper 15, thus vibrating all jointly at a predetermined cycle transversely, or longitudinally.

Figure 5:
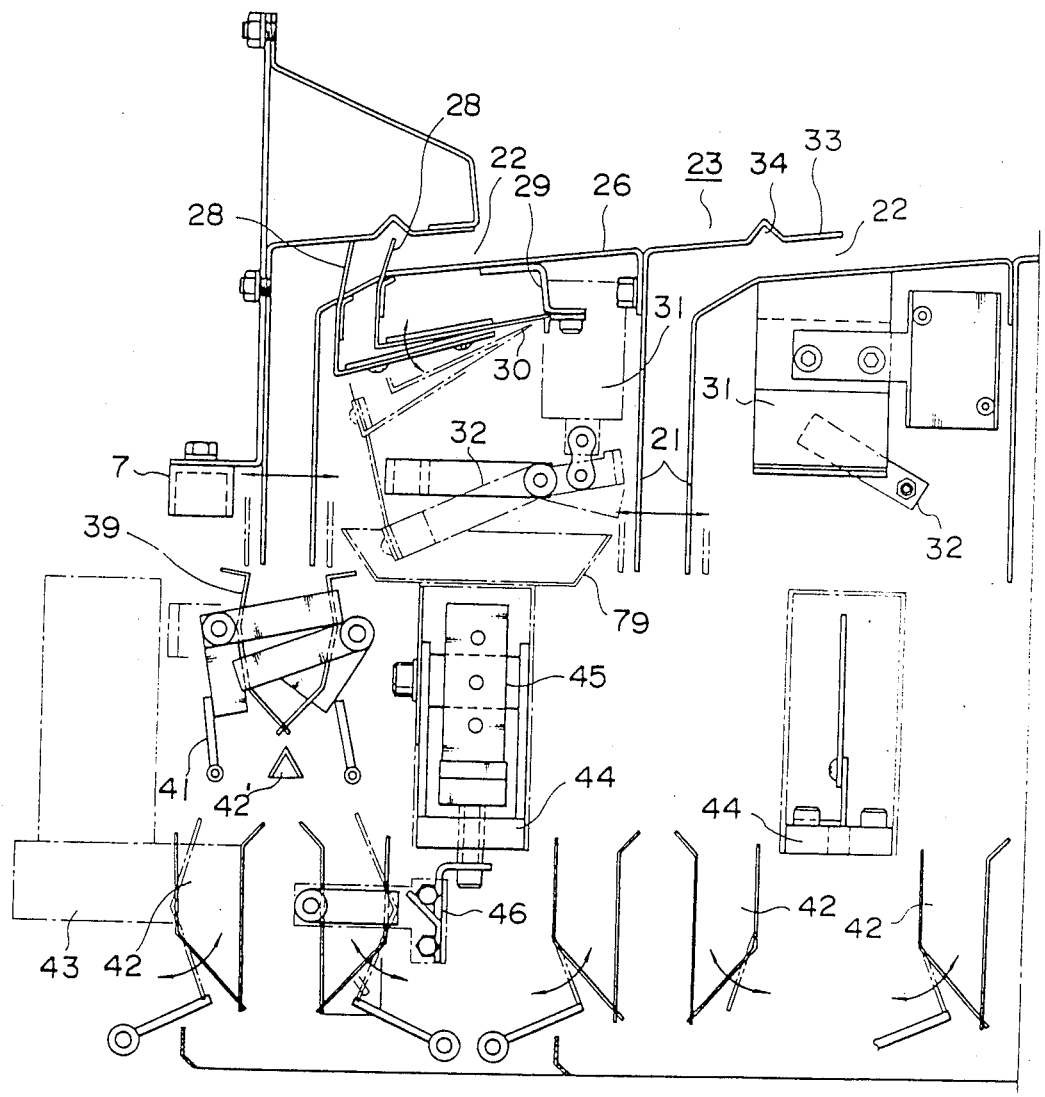
FIG. 5 is a fragmentary enlarged side view of a main part of FIG. 4.

Then, as shown in FIG. 5 and FIG. 8, a slit 17 is perforated nearly full width of a conveying plate 26 ahead of each opening 22 of the conveying trough 23, a shutter 28 is provided movably in the slit 27, its base end side is provided on a bracket 29 mounted solidly on a lower side of the conveying plate 26 through a hinge plate 30, and the slit 27 is made liftable at a predetermined stroke to a solenoid 31 provided integrally on the lower side of the conveying plate 26 through a link 32, thereby operating the opening 22.

Further, a concavity 34 for interrupting a shutter on the rear side of the shutter 28 completely to the opening 22 is formed on a cover plate 33 on an upper side of each opening 22.

The solenoid 31 is mounted alternately left and right at each stage as shown in FIG. 5, and thus a space will be utilized effectively and the apparatus can be made compact in structure.

For the reson of illustration, the shutters 28, 28 are shown in one pair only in FIG. 5.

Then, as shown in FIG. 8, (FIG. 5 indicating the shutters 28, 28 in one pair; FIG. 8 indicating only one unit for the reason of illustration), the shutter 28 has three pices of shutter slits 35, 35, 35 which in the case of this embodiment are perforated in the cross direction at a set depth, namely the depth in which the lower end is kept deep so as to be lower than the slit 27 which the shutter 28 interrupts the opening 22 at full stroke, climbs and stops. Slender bridges 36, 36, 36 are provided longitudinally on the side of conveying plate 26 in which the slit 27 is perforated so as not to interfere with the shutter slits 35, 35, 35 of the shutter 28.

Then, each bridge 36 can be so provided by punching it out at the time of perforation of the slit 27 or by fixing it through welding or the like separately.

Further, each bridge 36 may be made in an X-shape to have a virtual interval between the bridges narrowed, which may prevent a considerably short broken noodle 1' mixed during the conveyance as shown in FIG. 8 from falling into the slit 27 through interference by each bridge 36 regardless of a posture of the shutter 28 to the slit 27. In this manner the measuring operation will be kept from interfering with each measuring mechanism or cloging the slit 27 and the shutter 28 to hinder the operation of the shutter 28 to the opening 22.

Figure 6:
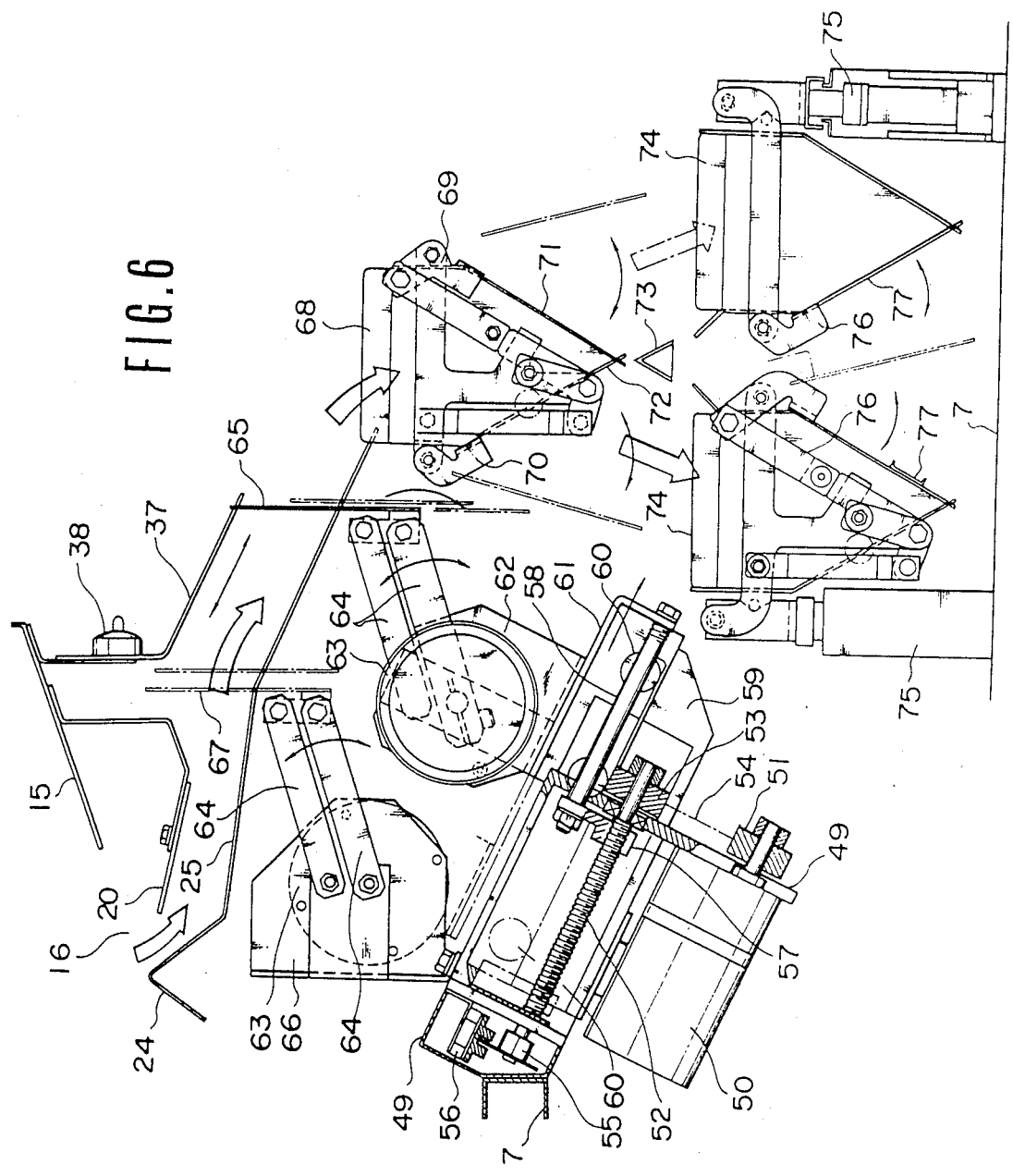
FIG. 6 is an enlarged explanatory drawing of a bulk weight measuring mechanism of the measuring unit.
Figure 7:
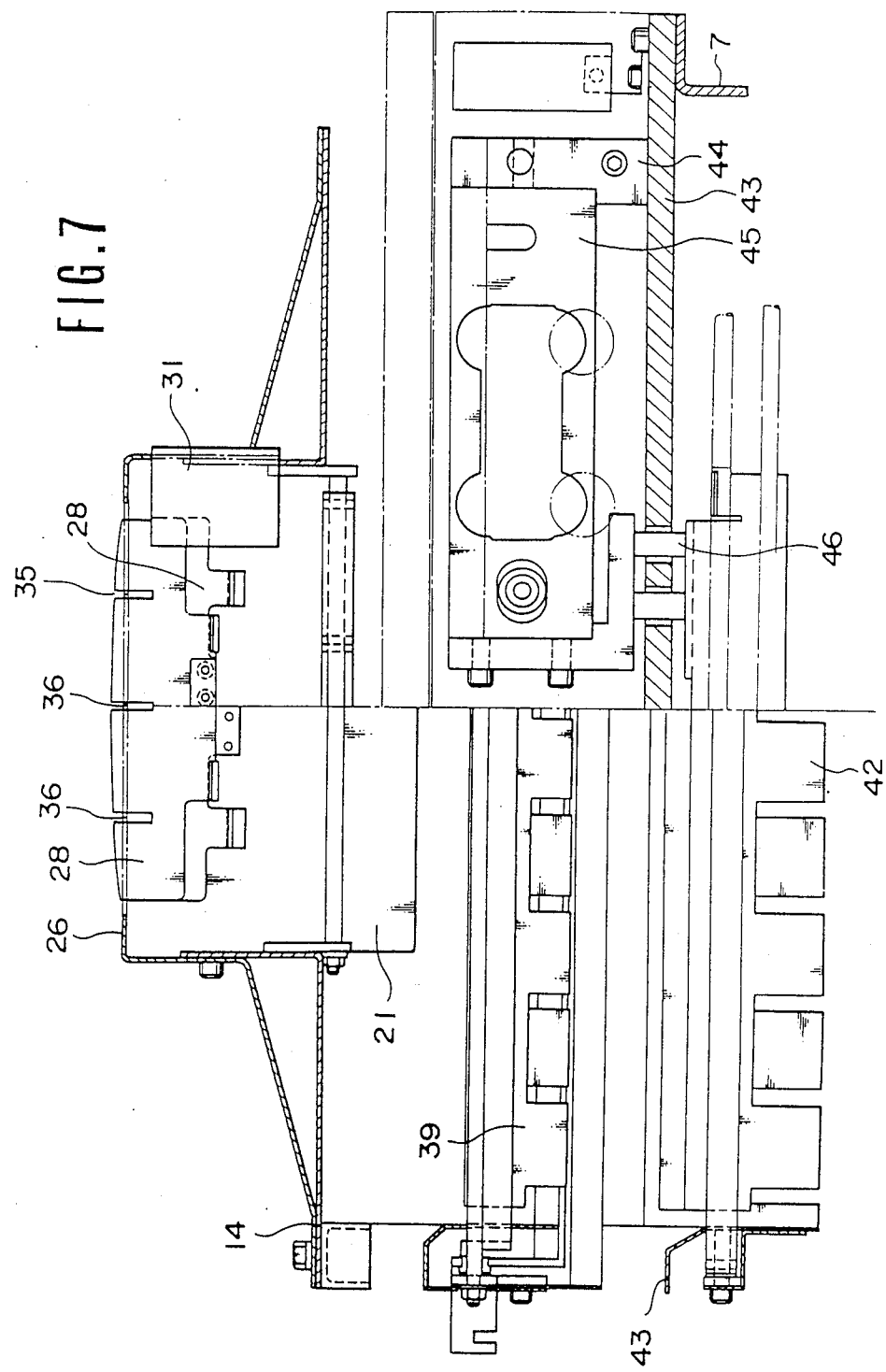
FIG. 7 is a fragmentary enlarge semi-sectional multiple explanatory drawing of a minor weight measuring mechanism.

On the other hand, a capacity height controlling plate 37 is provided to control the height to the bulk chute 25 provided extendedly counter to the conveying trough 23, as shown in FIGS. 4, 6, through an adjusting screw 38.

The above construction is then formed integral with the sub-frame 14 through the vibrator 18, thus constituting a vibration system.

Figure 9:
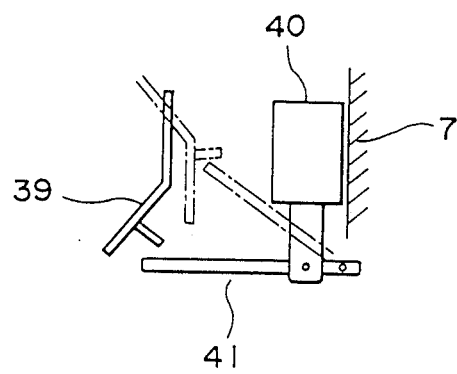
FIG. 9 is a schematic front view of a driving mechanism.

Next, referring to a fixed system and measuring system fixed on the apparatus frame 7, pool hopper 39, 39, . . . wedged in section and closable at both sides are suspended, as shown in FIGS. 4 and 5, on the apparatus frame 7 under the conveying trough 23, which are closable on both sides through a solenoid 40 shown in FIG. 9 which is connected to a predetermined controller in the control unit 6 and a link 41.

For the reason of illustration, the pool hopper 39 is shown in one unit only in FIG. 5.

Then, in the state where each pool hopper 39 is closed, it is designed that an amplitude of each chute 21 will be kept within a top opening of each pool hopper, as shown in FIG. 5, by the sub-frame 14 vibrated longitudinally for the extent of the upper end open zone.

Further, each pool hopper 39 is kept, as a matter of course, sufficiently longer than the set length of the dried noodle 1 as in the case of the chute 21.

Then, a divider 42', triangular in section and longer than the dried noodle 1 in length, is provided right under each pool hopper 39. Measuring hoppers 42, 42 single-open longitudinally of a center line of the pool hoppers and the divider 42' are suspended under pool hoppers 39 on a load cell 45 as a weight detector fixed through a bracket 44 to a sub-frame 43 slidable longitudinally left and right to the apparatus frame 7 through a bracket 46.

A measuring machine comprises the measuring hopper 42, the load cell 45 as a weight detector, and a coupling member for both the two.

Further, a single-open type closing cover of each measuring hopper 42 is made closable, as in the case of the pool hopper, through the solenoid 40 and the link 41 shown in FIG. 9.

Each pool hopper 39 can also be suspended on the sub-frame 43 according to design.

The load cells 45, 45, . . . are provided to each of the measuring hoppers 42, 42, . . . , however, to provide for a compact structure and design of the apparatus, they are provided on an end portion alternate longitudinally left and right of each measuring hopper 42.

Accordingly, each measuring hopper 42 (pool hopper 39, too according to design therefor), the load cell 45, the solenoid 40 working as a closing cover driver, the link 41 and others are all mounted solidly on the sub-frame 43, and thus the measuring unit can be pushed sideways for maintenance, checking and cleaning by sliding the sub-frame 43 vertically left and right to the apparatus frame 7.

Then, a collecting chute 47 for all the measuring hoppers 42, 42, . . . is fixed on the apparatus frame 7, and a timing hopper 48 is provided on a lower end thereof to face on the bucket conveyor 11 of the delivery unit 4.

Another sub-frame 49 of the apparatus frame 7 is fixed under the bulk chute 25 counter to the conveying trough 23, and a timing belt 54 is laid between a sprocket 51 of a servomotor 50 provided on a lower side of the sub-frame 49 and a sprocket 53 of a feed screw 52 pivoted rotatably on the sub-frame 49.

A tachometer 55 (douser) is provided on a tip of the fed screw 52, which is opposite to a detector 56 (photosensor) provided in the sub-frame 49.

Further, a slider 57 engaging with the feed screw 52 is coupled integrally with a base bracket 61 moving longitudinally through rollers 60, 60 along a guide rail 59 fixed on the sub-frame 49 through a rod 58, a rotary solenoid 63 is provided on the base bracket 61 through a bracket 62, and a front shutter 65 movable vertically is provided ahead of a pair of links 64, 64 provided on the rotary solenoid 63, which slides and intersects to stand vertically against the bulk chute 25, climbs as high as the controlling plate 37 and descends with its top coming down to a lower side of the bulk chute 25.

The rotary solenoid 63 is fixed on the apparatus frame 7 through a bracket 66 near a side of the discharge port 16 of the feeding hopper 15 of the sub-frame 49, and a shutter 67 is provided ahead of the rotatable links 64, 64, which intersects the bulk chute 25 likewise, holds its upper end over the controlling plate 37 this side, and is descendable with its upper end coming to a lower side of the bulk chute 25.

The rotary solenoids 63, 63 are provided each on counter side at a position where the front shutter 65 and the rear shutter 67 are present left and right of a longitudinally paired, two-platelike and forward slanting bulk chutes 25, 25 and thus are ready for locking both end portions of a group of the dried noodles 1 sliding down onto the bulk chute 25.

Accordingly, the front shutter 65 is kept coming close to or parting from, as indicated by an arrow, the rotary solenoid 63 on fixed side, or the rear shutter 67, through the feed screw 52 rotating forward and backward on rotation of the submotor 50 through the rotary solenoid 63, thereby controlling a volume of content of the dried noodle 1 between the front shutter 65 and the rear shutter 67.

Then, the control is effected by feedback of the controller in the control unit 6 according to a detection signal of the detector 56 for detecting a rotational frequency of the tachometer 55 on the tip of the feed screw 52.

A nose of the bulk chute 25 is faced on a bulk pool hopper 68 suspended on the apparatus frame 7, left and right closing covers 71, 72 are provided on the bulk pool hopper 68 through links 69, 70, and the links 69, 70 are operated by the controller in the control unit 6 through a solenoid (not illustrated), operating the closing covers 71, 72 alternately or randomly.

A divider 73 is provided right below the bulk pool hopper 68, a pair of bulk measuring hoppers 74, 74 are suspended on load cells 75, 75 fixed on the apparatus frame 7 to work as a bulk measuring apparatus symmetrically thereunder longitudinally crosswise of a center line of the bulk pool hopper 68 and the divider 73, and links 76, 76 operate closing covers 77, 77 through the controller in the control unit 6 alternately or arbitrarily as predetermined, thus releasing to a discharge chute for the bucket conveyor 11 of the delivery unit 4.

EMBODIMENT - ACTION

In the above-described construction, a set weight per measuring content of the dried noodle 1 is inputted by pushing an operation button (not illustrated) on the control panel 5, the servomotor 50 on the bulk measuring side is actuated to turn the feed screw 52 through the sprocket 51, the timing belt 54 and the sprocket 53, and while detecting a rate of the rotation through the tachometer 55 and the detector 56, the bracket 62 is moved longitudinally through the rod 58 to make the front shutter 65 come close to and part from the rear shutter 67 in shut-down and stop at a set position, and a rough measuring weight on bulk side is determined according to a volume between the two.

If, for example, the set weight of the dried noodle 1 is 500 g, then the measuring weight on the bulk side as a rough measuring value is about 400 g, and a combined measuring value of correction feeding differential weight from the conveying trough 23 side is about 100 g.

Accordingly, even from determining a volume of the dried noodle to be fed to bulk side by adjusting the distance between the front shutter 65 and the rear shutter 67 by running the servomotor 50 as described above and changing the set weight, the change is absorbed at the bulk side at all times and the corrected combined measuring on the conveying trough 23 side can be made almost constant at all times within 100 g or so in capacity. Therefore a supply adjustment to each measuring hopper 42 will not be required and a substantial and elastic weight measuring can be effected within several kg as a whole.

Further, when the rough measuring value on bulk side is thus determined through the control panel 5, the vibrator 18 provided on a top of the apparatus frame 7 is operated by actuation of the motor 17, the sub-frame 14 is vibrated through the connecting rod 19, and the dried noodle 1 is aligned manually and fed from the opening on the top of the feeding hopper 15.

Thus, the dried noodle 1 group fed into the feeding hopper 15 is distributed longitudinally at a set ratio by the divider 17 of the feeding hopper 15, and also in a vertically aligned state on the vibration, and is delivered to the conveying trough 23 side and the bulk chute 25 side distributively from the discharge port 16 without loading, bridging and breaking.

Meanwhile, the dried noodle 1 group fed to the bulk chute 25 side on a bulk rough measuring side is fed incessantly through a set adjustment of the shutter 20 and a vibration of the feeding hopper 15 by the vibrator 18, the rotary solenoids 63, 63 are turned at a set timing of the controller provided in the control unit 6. The rear shutter 67 is kept down beforehand to the lower side of the bulk chute 25, but the front shutter 65 climbs, on the contrary, to the height intersecting the controlling plate 37. The dried noodle 1 group sliding continuously downward on an abrupt slope of the bulk chute 25 collides with the front shutter 65 to stop, and is retained by the controlling plate 37 to over-flow no more.

Then, the rear shutter 67 climbs as high as the level of the controlling plate 37 through the links 64, 64 on turning of the rotary solenoid 63 on fixed side through the controller in the control unit 6 at a predetermined timing, the dried noodle 1 group kept there by the front shutter 65 is further separated at a portion of the rear shutter 67 and a supply capacity is determined.

The rotary solenoid 63 on the front shutter side is then turned to a descent side, the front shutter 65 descends lower than the level of the bulk chute 25 through the links 64, 64, the dried noodle 1 group retained between both the shutters slides downward through the bulk chute 25 into the bulk pool hopper 68, and, since the covers 71, 72 on both sides are closed, it is kept in the bulk pool hopper 68. However, the closing cover 71 or 72 on either one determined side is opened by the control unit 6 through the link 69 or 70 coming near the solenoid side, therefore it is fed into either one bulk measuring hopper 74 disposed symmetrically thereunder through the divider 73 and has the rough measuring weight detected on the load cell 75 working as a weight detector. A detection signal is inputted to a microcomputer in the controller of the control unit 6, and a differential weight between the set weight and the detected rough measured value is computed.

Then, the closing cover 77 is opened by the link 76 through the solenoid 40 according to a predetermined control mechanism, and it is fed into the bucket conveyor 11 of the delivery unit 4 through a discharge chute 78 and conveyed to a correction combined measuring unit.

Next, the rotary solenoid 63 on moving side is again operated reversely to allow the front shutter 65 to climb, the rotary solenoid 63 on the fixed side is operated reversely to allow the rear shutter 67 to descend, the dried noodle 1 group retained in front of the rear shutter 67 is then carried forward to the front shutter 65 and retained there again, the rotary solenoid the moving side is moved to the descent side at the set timing likewise, and the front shutter 65 is moved downward from the bulk chute 25 and the divided dried noodle 1 group is fed into the bulk pool hopper 68.

However, in the above process, since the weight for measuring on the bulk measuring side is large, an inertia of the fed weight in the bulk measuring hopper 74 becomes large, and hence an attenuation time in the load cell 75 is taken so long, so that an inferior operating efficiency will be induced from only one unit of the bulk measuring hopper 74 for the attenuation time.

Now, therefore, while the bulk rough measuring is carried out such on attenuation time of the bulk measuring hopper 74 of one side, the closing cover 72 on the side counter thereto will be opened by the controller in the control unit 6, and the next dried noodle 1 group retained in the upper bulk pool hopper 68 side is fed into the empty bulk measuring hopper 74 on the side free from weight measuring from the counter side, the closing cover 72 of which is opened by the controller of the control unit 6. The supporting load cell 75 waiting for stabilization of the attenuation, and on the other hand, a weight detection of the bulk measuring hopper 74 on the side stabilized through attenuation is effected and the closing cover 77 is opened by the controller in the control unit 6. It is then fed into the bucket conveyor 11 of the delivery unit 4, as described above, through the discharge chute 78, thus repeating the procedure thereafter, and the rough measuring of bulk weight will be carried out efficiently by changing the closing covers 71, 72 of the one bulk pool hopper 68 to operation against a pair of bulk measuring hoppers 74, 74.

In case the set weight is changed, the servomotor 50 is transferred on operation of the operating button of the control panel 5, and as detecting rotations of the tachometer 55 of the feed screw 52, the rotary solenoid 63 on the front shutter side is moved slantingly, and an interval between the rear shutter 67 and the front shutter 65 is adjusted to change and set capacity of the bulk rough measuring.

Needless to say, a longitudinal move of the front shutter 65 can be adjusted accurately through feedback control by rotating the servomotor 50 forward and backward on a detection signal of the detector 56 to the tachometer 55.

In a correction combined measuring system, the dried noodle 1 group is fed continuously into the conveying trough 23 vibrated in the cross direction, namely longitudinally, by the vibrator 18 through the sub-frame 14 jointly with the feeding hopper 15 at a predetermined cycle, and each dried noodle 1 group is delivered stepwise in order and kept aligned in a process through an incressant path of the discharge port 16 and the divider 24, likewise by way of the divider 17, and thus fed to a portion of each opening 22 evenly at all times.

Further, in each opening 22, the shutters 28, 28 shown in FIGS. 5 and 8 are operated alternately as in the case of both rear and front shutters on the bulk side, and the dried noodle 1 group filled between both the shutters 28, 28 is fed nearly quantitatively at every measuring.

Then, when the shutters 28, 28 are operated alternately by the link 32 through each solenoid 31, the dried noodle 1 group between the shutters 28, 28 immediately drops through the vertical downward chutes 21, 21, ... on vibration of the conveying trough 23 and inclination of the opening 22, and is then fed into the pool hoppers 39, 39, ... corresponding thereunder.

In this case, of course, where each pool hopper 39 is full of the dried noodle 1 group, unless the closing cover is opened to fed the dried noodle 1 group into the lower measuring hoppers 42, 42, the solenoid 31 is not actuated on a signal of the controller of the control unit 6, the shutters 28, 28 are not opened consequently, and the dried noodle 1 group is kept waiting for supply against the opening 22 as left full.

Then, when the lower side measuring hoppers 42, 42 have the closing covers opened to an empty state, each pool hopper 39 is opened by the controller in the control unit 6 to feed the internal dried noodle 1 into the lower measuring hopper 42. However, the solenoid 40 is actuated, in this case, according to a command signal of the controller in the control unit 6 and opens either the closing cover of those on both sides through the link 41, the dried noodle 1 stored in the pool hopper 39 is fed into either one of the measuring hoppers 42, 42 provided symmetrically under pool hoppers 39 through the divider 41' almost at the same weight.

The apparatus is thus unitized by having a pair of measuring hoppers 42, 42 disposed thereunder to one pool hopper 39, thereby securing a compactness in structure, a high efficiency and an accuracy in measuring.

As described hereinbefore, the broken noodle 1' is quite unavoidable during the process for manufacture or conveyance, however, the broken noodle 1' is mixed with a normal size of dried noodle 1 and conveyed incidentally, and as shown in FIG. 8, the broken noodle 1' is normally not so long but not so short, and the length covers a certain range on an average. In this case, since the bridges 36, 36, 36 are provided on the slit 27 of the lower plate 26 ahead of the opening 22 at a position so as not to interfere with the shutter slits 35, 35, 35 of the shutter 28, a substantial gap of the slit 27 will work as an interval of the bridges 36, 36, 36, and hence the conveyed broken noodle 1' is supported on the bridges 36, 36, 36, passes the slit 27 without dropping therefrom, and hence is not capable of hindering a vertical move of the shutter 28 by being caught between the moving shutter 28 and the slit 27 or causing a bridge action to the pool hopper and the measuring hopper 42 from dropping through the chute 21 at an unexpected angle.

Then, the shutter 28 climbs until it is fitted in the concavity 34 of the upper side cover plate 33 and stops, the opening 22 is completely interrupted, and an alignment action is further accelerated on vibrations by the vibrator 18 in the opening 22 during interruption. The broken noodle 1' is also aligned incidentally with a normal size of the dried noodle 1 consequently, and hence is not to drop onto the slit 27 from among the bridges 36, 36, 36.

Further, there may be a case where the powdery dried noodle 1 happens to drop unexpectedly. However, no influence will be exerted on a vertical move of the shutter 28 or a function of the measuring mechanism, and in such a case, it is received on a saucer 79 as shown in FIG. 5 and removed properly when the sub-frame 43 is drawn out sideways.

The dried noodle 1 is then introduced to the pool hoppers 39, 39, . . . according to an operation of the shutters 28, 28, . . . at a set timing by the controller in the control unit 6 in an approximate weight with the least dispersion, and the dried noodle 1 is also fed into the lower measuring hoppers 42, 42, . . . paired each through the controller in the weight having a difference almost coming within a set range.

A detected weight of the dried noodle 1 fed into each measuring hopper 42 is inputted to the microcomputer in the control unit 6 from the load cell 45 supporting each measuring hopper 42.

Further, as described previously, each dried noodle 1 is fed into the measuring hoppers 42, 42, . . . within a set range of dispersion for a target value of the differential weight between a bulk rough measured value detected and stored by each bulk measuring hopper 74 on the bulk side and a set weight, namely, for example, 92g on the correction combined measuring side according to statistics and probability which is obtainable from the set weight being 500 g and the rough measured value being 408 g on the bulk measuring hopper 74.

Accordingly, the dried noodle 1 for which the bulk weight is meausured roughtly at 408 g on the bulk measuring hopper 74 is fed into the bucket 11 from the discharge chute 78. The microcomputer in the control unit 6 computes which detected measuring hopper 42 to determine for the combination to obtain the correction target weight 92 g plus minimum excess at a timing for conveyance to the timing hopper 48 on the correction combined measuring side. An optimum combination is thus selected, the solenoid 40 is actuated through the controller in the control unit 6, the selected measuring hoppers 42, 42, . . . have the closing covers opened through the link 41, the noodle is discharged onto the timing hopper 48 through the collecting chute 47, and when the bucket into which the 408 g bulk dried noodle 1 subjected to the above bulk rough measuring is fed comes under the timing hopper 48, the timing hopper 48 is opened through the controller in the control unit 6 to correcting feed onto the bucket conveyor 11, the dried noodle 1 accurately at the target value 500 g is measured as the weight plus minimum excess and is fed into the bucket conveyor 11, and then moved to the timing hopper 12 for the next-stage packaging process through the delivery unit 4.

As described hereinbefore, where the set weight is changed to 700 g, no change will be brought on the function whereby the correction combined measuring is effected accurately within 100 g at all times. Therefore the supply capacity can be changed to have a variety of set weights flexibly in the bulk rough measuring by adjusting the front shutter 65 for distance to the rear shutter 67 from rotating the servomotor 50 forward and backward by operation of the button according to the control panel 5 and thus moving the rotary solenoid 63 on the front shutter side longitudinally.

Further, the bulk rough measuring unit is relatively simple in structure. However, the correction combined measuring unit is extremely complicated, and vibrations are given by the vibrator 18 in addition. Therefore there may be a case where maintenance and check are necessary as occasion demands, and if so, the sub-frame 43 to the apparatus frame 7 is slided to go left and right vertically, as described hereinbefore, the measuring hoppers 42, 42, . . . (pool hoppers 39, 39, . . . , too according to design as described), the load cells 45, 45 and the solenoids 40, 40, . . . are all exposed outwardly, and thus maintenance, check and cleaning can be carried out securely as predetermined.

It goes without saying that an embodiment of this invention is not necessarily limited to the abovedescribed example, and the conveying trough can be made to extend sideways by providing a sub-frame thereon, thus enhancing the ease of maintenance, checking and the like.

Further, objects which can be measured are not limited to dried noodles, and various modes can be employed for measuring incense sticks, stick cakes and the like.

EFFECT OF THE INVENTION

As described above, according to this invention, elongated objects such as dried noodles or the like can be conveyed basically in the cross direction continuously as aligned in the posture, fed further into each pool hopper in a multistage manner during conveyance, and despite the fact that the object to be measured is of a long size and a linear stick form having a directional property against each measuring hopper provided under the pool hopper, a combined measuring to an optimum target value with a minimum excess in weight is effected according to statistics and probability to provide a superior effect.

Further, in the apparatus a vibrator is provided for the feeding hopper and the conveying trough through a sub-frame, that the vibration is given longitudinally, or transversely thereof at all times, and the elongated object is fed at a uniform density as aligned, and hence the long size can be fed uniformly as aligned to each opening. Consequently a number of opening stages at the conveying trough can be taken plurally, resulting in measuring at high precision to provide a superior effect.

Further, the pool hopper and the measuring hopper are mounted on the sub-frame slidable to the apparatus frame together with the load cell supporting the measuring hopper. By moving sideways of the apparatus maintenance, checking and cleaning can be carried out by moving the complicated measuring unit to apparatus side accordingly, which facilitates necessary woking thereon.

The downward chute provided on the opening of the conveying trough for correction measuring is connected to the pool hopper, and each pool hopper has a pair of measuring hoppers connected thereunder. Therefore each opening is ready for feeding into two units of measuring hoppers, measuring data is increased thereby, and thus the combined measuring to a set weight value is secured more accurately to provide a superior effect.

Furthermore, the bulk chute with its base end facing on a discharge port of the feeding hopper is kept facing on the bulk pool hopper. The bulk pool hopper is connected to the bulk measuring hopper supported on a bulk weight detector, and an adjusting shutter is provided to the bulk chute. Therefore even if a capacity of the combined measuring unit of the conveying trough is determined almost constant, a set bulk weight can be adjusted to change elastically by the adjusting shutter for bulk rough measuring capacity on the bulk pool hopper and the bulk measuring hopper, so that a capacity can be amplified thoroughly from one unit of the apparatus to provide a superior effect.

In this case, if the bulk measuring hopper is provided under the bulk pool hopper in two units for alternate measuring in design, an efficient operation will be obtainable thereby through compensating the time for the vibration due to feeding into the bulk measuring hopper to attenuate with a measuring on the other bulk measuring hopper.

Further, an arrangement is such that a position of the front shutter can be adjusted manually or automatically to the rear shutter on the upstream side for the adjusting shutter, therefore a degree of setting freedom of the bulk rough measuring can be enlarged to a effect.

Then, since the shutter is made descendable and closable to the opening in the conveying trough, the long size is fed almost at a constant weight at the opening and thus an effect is so ensured to the corresponding pool hopper. On the other hand, since a bridge not to interfere with a slit provided on the shutter is provided on the conveying trough, the long size such as dried noodle or the like which happens to contain an unexpected short size such as broken noodle or the like will never be caught between the slit of the conveying trough and the shutter, thus ensuring smooth operations of the functions of the shutter and the measuring mechanism as well providing a superior effect.

Accordingly, the apparatus operates smoothly and no corresponding problems will be involved therewith.

What is claimed is:

1. In an apparatus for measuring long objects having a plurality of weight detectors provided transversely under a long feeding hopper the improvement comprising providing a transverse conveying trough with its base end facing the feeding hopper, the trough has a plurality of openings disposed stepwise, each opening is connected to a downward chute, each downward chute is connected to a pool hopper provided on a lower side measuring hopper supported on the weight detector, a bulk chute is disposed opposite the conveying trough, the base end of the bulk chute facing the feeding hopper, the trough connected to a bulk pool hopper connected to a measuring hopper supported on the weight detector, with a set capacity adjusting shutter provided on the back chute comprising a rear shutter moving vertically at a fixed position and a movable front shutter, a cover closing device for each pool hopper, and the measuring hopper connected to a control unit.

2. The apparatus of claim 1 wherein the bulk measuring hopper is provided in pairs and the bulk pool hopper provided thereon is connectable to the pair of bulk measuring hoppers by selectively closing each of a pair of covers.

3. In an apparatus for measuring long objects having a plurality of weight detectors provided transversely under a long size feeding hopper, the improvement comprising providing a transverse conveying trough with its base end facing the feeding hopper, the conveying trough having a plurality of openings disposed stepwise, each opening connected to a downward chute, each chute connected to a pool hopper provided on a lower side hopper supported on a weight detector, a vertical slit provided on each opening of the conveying trough, a shutter provided closably to the opening, and a bridge provided whereby the shutter can be inserted on the slit on the conveying trough.

4. The apparatus of claim 3 wherein a contact concavity of the shutter is formed on an upper side cover plate of the opening.

* * * * *